US006633827B2

(12) United States Patent
Dietmayer

(10) Patent No.: US 6,633,827 B2
(45) Date of Patent: Oct. 14, 2003

(54) ARRANGEMENT FOR ANGLE MEASUREMENTS

(75) Inventor: Klaus Dietmayer, Ulm/Donau (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 49 days.

(21) Appl. No.: 09/847,219

(22) Filed: May 2, 2001

(65) Prior Publication Data

US 2001/0056333 A1 Dec. 27, 2001

(30) Foreign Application Priority Data

May 6, 2000 (DE) .......................... 100 22 175

(51) Int. Cl.[7] .................... G01K 7/00; G01C 17/38
(52) U.S. Cl. .................... 702/130; 702/95; 702/151
(58) Field of Search .................... 702/151, 130, 702/104, 99, 95, 90–92; 73/1.01, 1.75; 324/202, 207.21

(56) References Cited

U.S. PATENT DOCUMENTS

| 4,739,560 A | 4/1988 | Akutsu et al. ................. 33/361 |
| 5,297,063 A | * 3/1994 | Cage ............................ 702/95 |
| 6,304,074 B1 | * 10/2001 | Waffenschmidt ............ 324/202 |
| 6,418,388 B1 | * 7/2002 | Dietmayer .................... 702/95 |

FOREIGN PATENT DOCUMENTS

| DE | 3634468 A1 | 4/1987 |
| DE | 19757196 | 6/1999 |
| DE | 19757196 A1 * | 6/1999 |
| EP | 0997701 A2 | 5/2000 |

* cited by examiner

*Primary Examiner*—Bryan Bui
(74) *Attorney, Agent, or Firm*—Steven R. Biren

(57) ABSTRACT

Angle measurement is accomplished through an angle sensor (1) supplying two sensor signals which are phase-shifted by 90 degrees relative to each other and whose amplitudes are dependent on the temperature, determined by a temperature sensor (7) and fed to a microprocessor (6). The microprocessor (6) computes amplitude values of the sensor signals expected in dependence upon the temperature value supplied by the temperature sensor (7), compares these values with the actual amplitude values of the sensor signals, and generates an error signal when the deviation between the expected and actual amplitude values exceeds a predetermined limit value.

14 Claims, 3 Drawing Sheets

ARRANGEMENT FOR ANGLE MEASUREMENTS

BACKGROUND AND SUMMARY OF THE INVENTION

The invention relates to an arrangement for angle measurement by means of an angle sensor supplying two sensor signals which are phase-shifted by 90 degrees relative to each other and whose amplitudes are dependent on the temperature. In such arrangements, there is generally the problem that the sensor signals supplied by the angle sensor are very much dependent on temperature as regards their amplitudes.

An arrangement comprising an azimuth sensor is known from U.S. Pat. No. 4,739,560, in which the amplitudes of the sensor signals are corrected in dependence upon the temperature. This means that the temperature is determined and the change of the amplitudes of the sensor signals, expected as a result of this temperature, is compensated.

It is an object of the invention to improve the arrangement of the type described in the opening paragraph to such an extent that the faultless operation of the arrangement can be monitored.

This object is achieved in that the arrangement comprises a temperature sensor and a microprocessor, and in that the microprocessor computes amplitude values of the sensor signals expected in dependence upon a temperature value supplied by the temperature sensor, compares these values with the actual amplitude values of the sensor signals, and generates an error signal when the deviation between the expected and actual amplitude values exceeds a predetermined limit value.

The microprocessor which evaluates the sensor signals is associated with the temperature sensor. The temperature sensor supplies a temperature signal in dependence upon the temperature. Again in dependence upon this temperature signal, the microprocessor is capable of determining which amplitudes the sensor signals should have at the given temperature, because the dependence of the amplitude fluctuations of the sensor signals on the temperature is known.

The microprocessor can thus determine in advance which amplitudes the sensor signals supplied by the angle sensor should have at the given temperature. These expected amplitudes are compared with the actually determined amplitudes of the sensor signals. When the difference between these signals precedes a predetermined limit value, this indicates that there is an erroneous situation. In this case, the arrangement generates an error signal which may be used, for example, in subsequent circuit arrangements for suppressing the evaluation of the sensor signals. Thus the faultless operation of the arrangement including the angle sensor can be monitored.

The comparison between the actual and the expected amplitude values of the sensor signals can be most easily realized by comparing the maximum amplitudes of the two signals, as in an embodiment of the invention as defined in claim 2.

In accordance with a further embodiment of the invention as defined in claim 3, the microprocessor is formed in such a way that it uses the CORDIC algorithm for computing an angle, so that the radius determination provided anyway within the CORDIC algorithm can also be simultaneously used for determining the maximum values of the actual and current amplitude values. The CORDIC algorithm as such is known from, for example, "Digitale Signalverarbeitung in der Nachrichtenübertragung" by Gerdsen and Kröger, pp. 108 to 115. The computation of the expected amplitude values in dependence upon the temperature is realized by means of an analytical function.

The signals supplied by the angle sensor may be converted so that, as in a further embodiment of the invention as defined in claim 4, they can be converted, for example, from differential signals to asymmetrical signals. They can also be converted from analog signals to digital signals. Further conversions are also feasible; in any case, amplitude values of the sensor signals, dependent on the temperature, are obtained for the input signals of the microprocessor.

As defined in claim 5, the kind of temperature dependence may be stored in an EEPROM and used by the microprocessor for determining the expected amplitude values. When the temperature sensor supplies, for example, an analog signal, this signal is converted by means of an A/D converter into the digital range and applied to the microprocessor in order that this microprocessor can evaluate the signal. When in such a constellation, as in a further embodiment of the invention as defined in claim 7, also a multiplexer is provided, then it is possible to reconvert the analog output signal of the circuit arrangement time sequentially by means of the A/D converter into a digital signal and apply it to the microprocessor. This provides the possibility of controlling the analog output signal of the circuit arrangement. Due to this feedback, the microprocessor can steadily check whether the output signal actually corresponds to the values supplied. This allows an additional error control.

These and other aspects of the invention are apparent from and will be elucidated with reference to the embodiments described hereinafter.

DESCRIPTION OF THE PREFERRED EMBODIMENT

Figure 1:
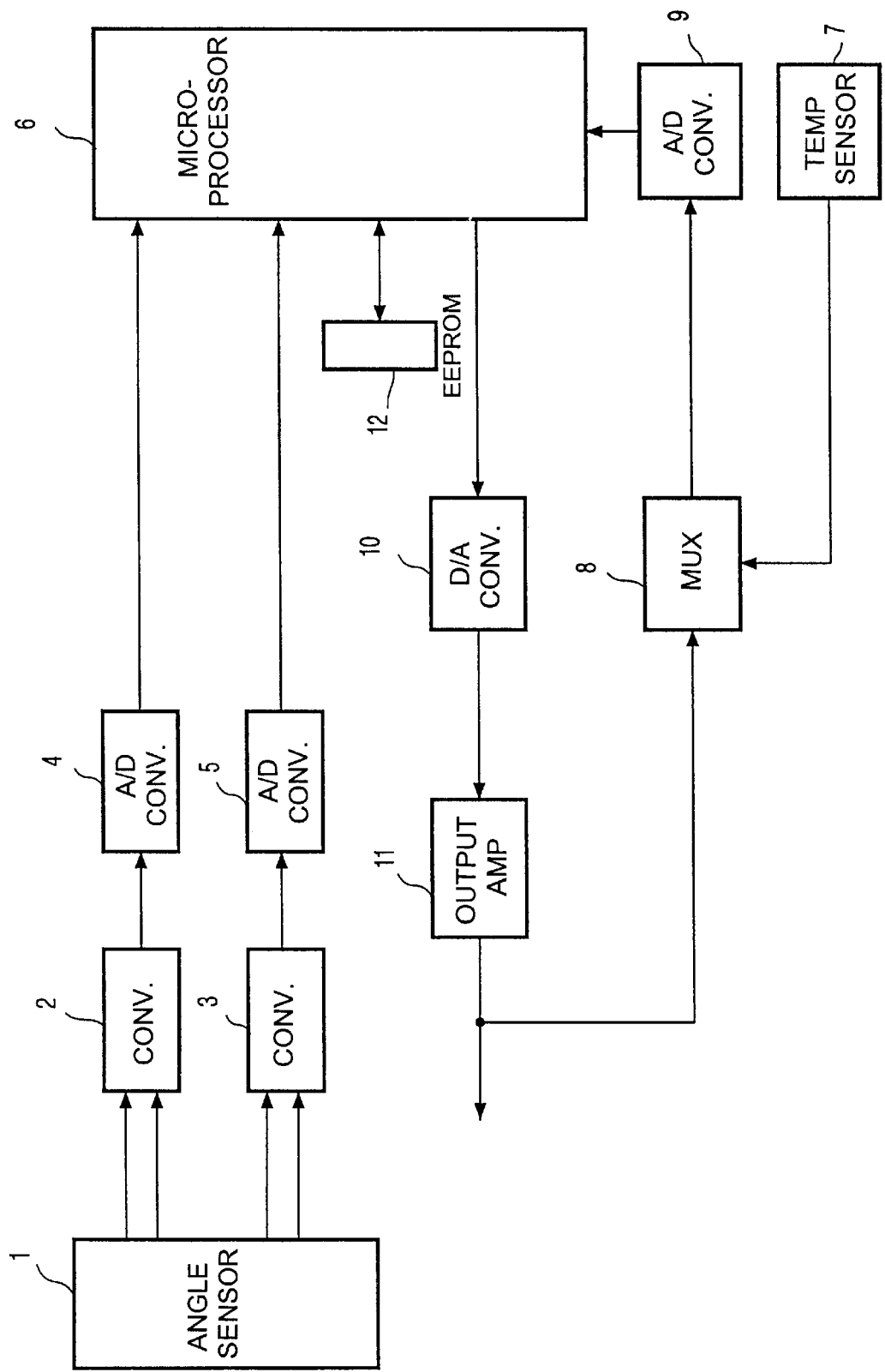
FIG. 1 is a block diagram of an arrangement for angle measurement according to the invention.

FIG. 1 is a block diagram of an arrangement for angle measurement according to the invention, comprising an angle sensor 1 supplying two sensor signals which are 90° phase shifted with respect to each other. These sensor signals are present in a differential, symmetrical form and are applied to a converter 2, 3, respectively, in which the signals are converted into asymmetrical signals. After conversion into asymmetrical signals, these signals are still present in an analog form and are converted into digital signals by means of an A/D converter 4, 5, respectively, which digital signals are applied to a microprocessor 6. The microprocessor 6 is capable in known manner of computing an angle from the two 90° phase-shifted phase signals, for example, by means of the CORDIC algorithm. The microprocessor 6 supplies a corresponding angle signal which is converted into an analog signal by means of a D/A converter 10. An output amplifier 11 is provided, which supplies the analog angle signal to subsequent circuit arrangements.

The amplitude of the sensor signal indicates, however, a clear temperature dependence. In the circuit arrangement according to the invention, this temperature dependence of the sensor signals is used to check the faultless operation of the circuit arrangement.

To this end, a temperature sensor 7 is provided, whose analog output signal is applied via a multiplexer 8 to an A/D converter 9 whose output signal is again coupled to the microprocessor 6. The microprocessor 6 thus receives a signal which supplies information about the current temperature.

Furthermore, an EEPROM 12 is provided in which the kind of dependence between the temperature and the amplitude of the sensor signals is stored.

The microprocessor 6 determines, from the actual temperature, those amplitude values of the sensor signals which are to be expected at the current temperature. While taking the phase positions of the signals into account, the instantaneous amplitudes of the signals can be compared. It is, however, essentially easier, without limitations as regards the function, to compare the maximum values of the signals.

In the arrangement of this embodiment, the microprocessor computes the angle signal by means of the CORDIC algorithm. Since a radius computation of the two sensor signals is performed anyway in the CORDIC algorithm, the maximum value of the actual sensor signals is also available. The microprocessor 6 compares this with the maximum value of the expected amplitude values of the sensor signals, which are computed in dependence upon the temperature signals applied to the processor. In this simple comparison, a deviation between the maximum values of the actual amplitude values and the expected amplitude values may be found. When this deviation exceeds a predetermined limit value, the maximum values of the actual amplitude values of the sensor signals deviate relatively strongly from the maximum values of the expected amplitude values and it may be assumed that there is an erroneous situation, i.e. at least one of the signals is disturbed, interrupted, or the like. In this case, the microprocessor 6 supplies an error signal which signalizes, for example, an erroneous situation in possibly subsequent circuit arrangements (not shown).

The embodiment of the circuit arrangement of FIG. 1 according to the invention also includes a further error control, which is possible with a small number of components, because an A/D converter 9 is provided anyway for the A/D conversion of the analog output signal of the temperature sensor 7. In fact, by means of the multiplexer 8, the analog output signal of the amplifier stage 11 is time-sequentially fed back again to the microprocessor 6 via the multiplexer 8 and the A/D converter 9. This signal should approximately correspond to the signal supplied as an angle signal to the D/A converter 10 by the microprocessor 6. By comparing these two signals, the microprocessor 6 can recognize whether there is an error in the output stage which is constituted particularly by the D/A converter 10 and the amplifier 11. Also in this case, an error signal can be applied to subsequent circuit arrangements (not shown).

The circuit arrangement according to the invention is thus capable of continuously checking the amplitudes of the sensor signals, while the temperature dependence can also be taken into account. An erroneous situation can thus be detected immediately.

Figures 2A, 2B:
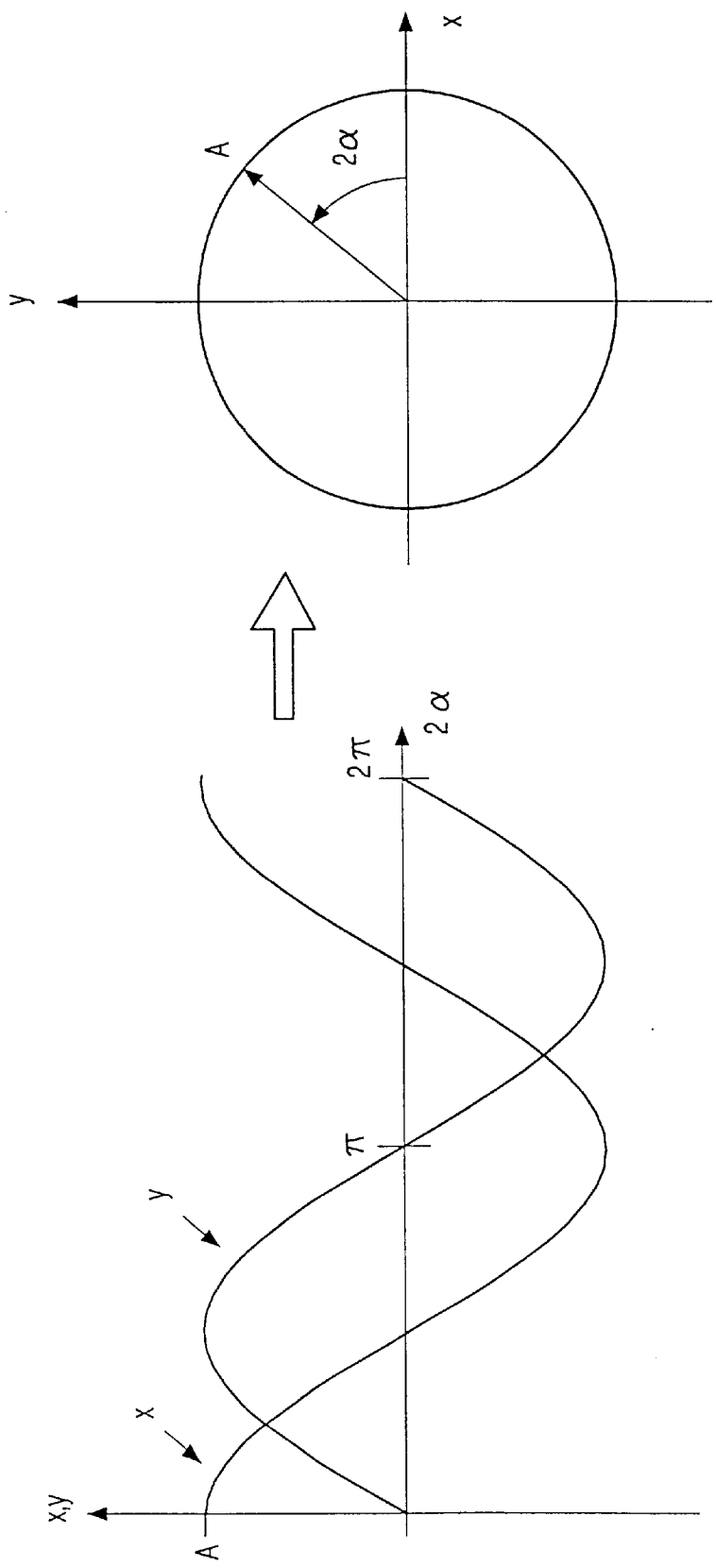
FIG. 2 shows the sensor signals supplied by the angle sensor of FIG. 1.

FIG. 2 shows the two sensor signals x and y. These are sine/cosine signals which have a phase shift of 90° with respect to each other. FIG. 2A shows these two signals through an angle of 2π. When these signals are transferred for every possible angle between 0 and 2π in a system of co-ordinates of the values x and y, a circle as shown in FIG. 2B is obtained. The maximum amplitude A of the two signals is already obtained from this simple conversion, as well as the angle which is relevant to the angle signal. This provides the possibility of determining the amplitude values of the sensor signals, while in this method a maximum amplitude value, which is continuously available, is determined for both sensor signals.

Figure 3:
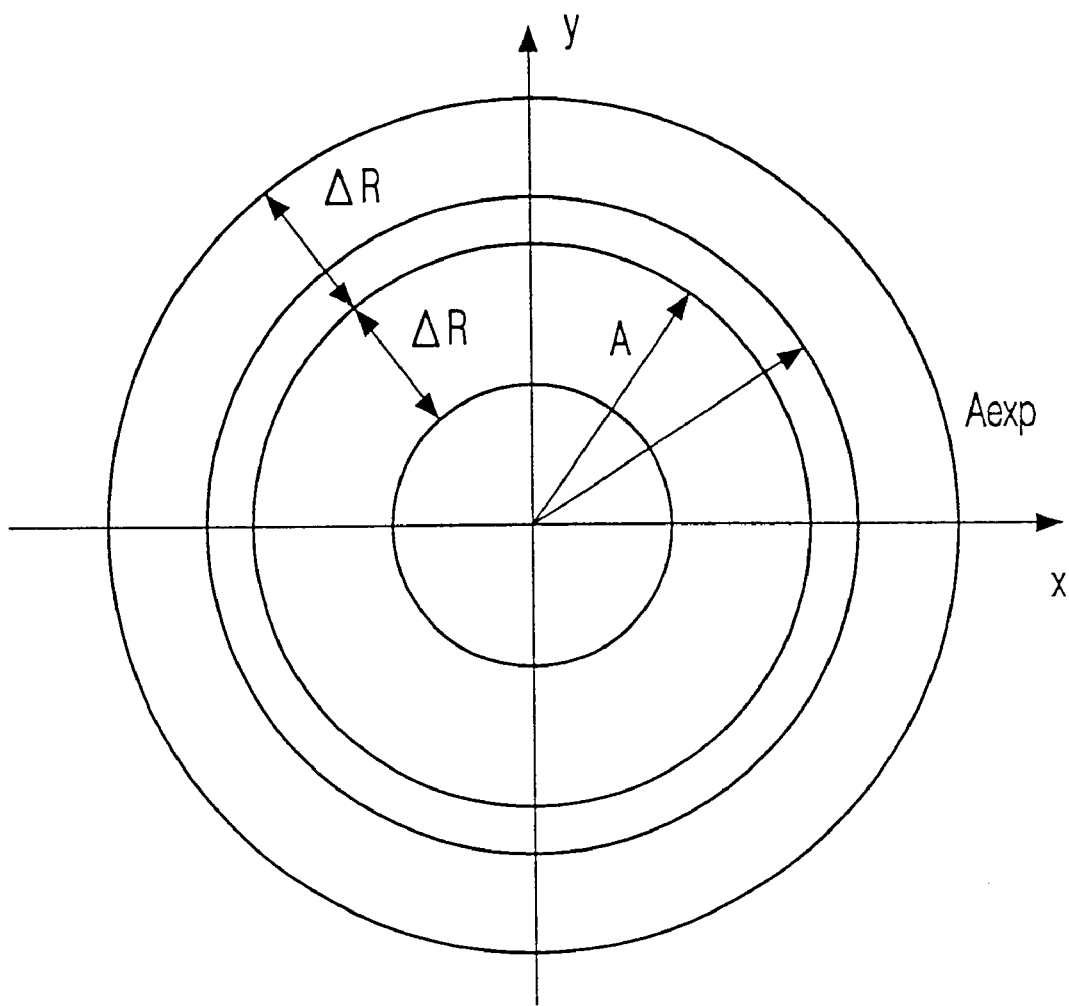
FIG. 3 shows diagrammatically the comparison between the expected and the actual amplitude values of the angle sensor.

FIG. 3 shows diagrammatically how this maximum amplitude value A thus obtained of the actual sensor signals can also be compared with the expected amplitude values in an x, y system of co-ordinates. When a maximum amplitude value Aexp is computed for the expected sensor signals in a corresponding manner, it should be in a range +ΔR, −ΔR around the value A. This is the predetermined limit value described hereinbefore, which must not be exceeded by the difference between the values A and Aexp. When this value is exceeded, it is very likely that there is an erroneous situation in which at least one of the sensor signals is disturbed or interrupted. Then, the microprocessor supplies an error signal in the arrangement shown in FIG. 1.

What is claimed is:

1. An arrangement for angle measurement by means of an angle sensor (1) supplying two sensor signals which are phase-shifted by 90 degrees relative to each other and whose amplitudes are dependent on the temperature, characterized in that the arrangement comprises a temperature sensor (7) and a microprocessor (6), and in that the microprocessor (6) computes amplitude values of the sensor signals expected in dependence upon a temperature value supplied by the temperature sensor (7), compares these values with the actual amplitude values of the sensor signals, and generates an error signal when the deviation between the expected and actual amplitude values exceeds a predetermined limit value, and wherein the temperature sensor (7) supplies an analog signal which is converted into a digital signal by means of a third ND converter (9) and is coupled to the microprocessor.

2. An arrangement as claimed in claim 1, characterized in that the microprocessor (6) computes expected maximum values of amplitude of the sensor signals and compares these with the actual maximum value of the sensed amplitude.

3. An arrangement as claimed in claim 1, characterized in that, for computing an angle from the sensor signals, the microprocessor (6) uses a CORDIC algorithm and uses the radius determination provided anyway in the CORDIC algorithm also for determining the maximum computed amplitude values.

4. An arrangement as claimed in claim 1, characterized in that the angle sensor (1) supplies two symmetrical, differential signals which, after conversion into asymmetrical signals, are applied to a first and a second ND converter (4,5) whose output signals are coupled to the microprocessor (6).

5. An arrangement as claimed in claim 1, characterized in that the values of the temperature dependence of the sensor signals are stored in an EEPROM (12) which is accessed by the microprocessor (6) for computing the expected amplitudes of the sensor signal.

6. An arrangement for angle measurement by means of an angle sensor (1) supplying two sensor signals which are phase-shifted by 90 degrees relative to each other and whose amplitudes are dependent on the temperature, characterized in that the arrangement comprises a temperature sensor (7) and a microprocessor (6), and in that the microprocessor (6) computes amplitude values of the sensor signals expected in dependence upon a temperature value supplied by the temperature sensor (7), compares these values with the actual amplitude values of the sensor signals, and generates an error signal when the deviation between the expected and actual amplitude values exceeds a predetermined limit value, and wherein the microprocessor (6) supplies an angle signal indicating the computed angle, which signal is converted into an analog angle signal by means of a D/A converter (1), in that a multiplexer (8) is provided, whose first input receives the analog angle signal and whose second input receives the output signal of the temperature sensor (7), and which is succeeded by a third A/D converter (9), whose output signal is coupled to the microprocessor, and in that the microprocessor (6) couples the multiplexer (8) to its second input for determining the expected amplitude values of the sensor signals and to its first input for checking the output signal indicating the computed angle.

7. An arrangement as claimed in claim 6, characterized in that the microprocessor (6) computes expected maximum values of amplitude of the sensor signals and compares these with the actual maximum value of the sensed amplitude.

8. An arrangement as claimed in claim 6, characterized in that, for computing an angle from the sensor signals, the microprocessor (6) uses a CORDIC algorithm and uses the radius determination provided anyway in the CORDIC algorithm also for determining the maximum computed amplitude values.

9. An arrangement as claimed in claim 7, characterized in that the angle sensor (1) supplies two symmetrical, differential signals which, after conversion into asymmetrical signals, are applied to a first and a second ND converter (4,5) whose output signals are coupled to the microprocessor (6).

10. An arrangement as claimed in claim 6, characterized in that the values of the temperature dependence of the sensor signals are stored in an EEPROM (12) which is accessed by the microprocessor (6) for computing the expected amplitudes of the sensor signal.

11. An arrangement as claimed in claim 6, characterized in that the microprocessor (6) computes the expected maximum value of the actual amplitude values of the sensor signals and compares these with the maximum value of the actual amplitude values.

12. An arrangement as claimed in claim 6, characterized in that, for computing an angle from the sensor signals, the microprocessor (6) uses a CORDIC algorithm and uses the radius determination provided anyway in the CORDIC algorithm also for determining the maximum value of the computed amplitude values.

13. An arrangement as claimed in claim 6, characterized in that the angle sensor (1) supplies two symmetrical, differential signals which, after conversion into asymmetrical signals, are applied to a first and a second A/D converter (4,5) whose output signals are coupled to the microprocessor (6).

14. An arrangement as claimed in claim 6, characterized in that the values of the temperature dependence of the sensor signals are stored in an EEPROM (12) which is accessed by the microprocessor (6) for computing the expected amplitudes of the sensor signal.

* * * * *